(12) United States Patent
De'Longhi

(10) Patent No.: US 7,067,780 B2
(45) Date of Patent: Jun. 27, 2006

(54) CONTAINER FOR COOKING PASTA IN A MICROWAVE OVEN

(75) Inventor: Giuseppe De'Longhi, Treviso (IT)

(73) Assignee: De'Longhi S.p.A., Treviso (IT)

( * ) Notice: Subject to any disclaimer, the term of this patent is extended or adjusted under 35 U.S.C. 154(b) by 0 days.

(21) Appl. No.: 10/516,651

(22) PCT Filed: May 22, 2003

(86) PCT No.: PCT/EP03/05361

§ 371 (c)(1),
(2), (4) Date: Nov. 26, 2004

(87) PCT Pub. No.: WO03/099084

PCT Pub. Date: Dec. 4, 2003

(65) Prior Publication Data

US 2005/0217497 A1    Oct. 6, 2005

(30) Foreign Application Priority Data

May 29, 2002    (IT) .......................... MI2002A1157

(51) Int. Cl.
*H05B 6/80* (2006.01)
*A47J 36/02* (2006.01)
(52) U.S. Cl. ........................ 219/726; 219/32; 219/762; 99/DIG. 14; 99/348; 426/243

(58) Field of Classification Search ........ 219/725–735, 219/762; 99/DIG. 14, 348; 426/234, 243, 426/241
See application file for complete search history.

(56) References Cited

U.S. PATENT DOCUMENTS

| | | | |
|---|---|---|---|
| 4,959,517 A | | 9/1990 | Jump et al. |
| 5,315,083 A | * | 5/1994 | Green .......................... 219/734 |
| 5,807,597 A | * | 9/1998 | Barnes et al. ................ 426/234 |
| 5,988,045 A | | 11/1999 | Housley |

FOREIGN PATENT DOCUMENTS

| | | | |
|---|---|---|---|
| GB | 2 322 271 | | 8/1998 |
| JP | 06-113773 | * | 4/1994 ................. 426/243 |
| WO | WO 97/14271 | | 4/1997 |
| WO | WO 03/099084 | | 4/2003 |

* cited by examiner

*Primary Examiner*—Philip H. Leung
(74) *Attorney, Agent, or Firm*—Andrew Wilford

(57) ABSTRACT

A container for cooking pasta in a microwave oven is composed of a body manufactured in a material compatible with microwave ovens, and has therein a compartment to contain the pasta cooking water and a stirrer for the pasta during cooking.

10 Claims, 3 Drawing Sheets

1

CONTAINER FOR COOKING PASTA IN A MICROWAVE OVEN

CROSS REFERENCE TO RELATED APPLICATIONS

This application is the US national phase of PCT Application PCT/EP03/05361, filed 22 May 2003, which claims the priority of Italian national application MI 2002 A001157, filed 29 May 2002.

FIELD OF THE INVENTION

The present invention relates tO a container for cooking pasta in a microwave oven.

BACKGROUND OF THE INVENTION

It is a well known fact that since current microwave ovens are equipped with electrical resistors that operate in combined action with the microwaves, these ovens are able to cook the large majority of come on food products perfectly well, obtaining the same cooking quality as a traditional electric or gas oven.

However, current microwave ovens are not able to cook food products that normally require cooking in a liquid, such as water for example, that must still be cooked today in a saucepan placed on a traditional gas cooker flame.

The problem arises above all in the cooking of pasta, and in particular, long fine pasta like spaghetti because spaghetti requires an established minimum quantity of water and must be stirred during cooking to prevent it from sticking together.

Moreover, it is necessary to control monitor the cooking process constantly to prevent any foam from boiling over the pan edges.

OBJECTS OF THE INVENTION

Therefore the object of this invention is to eliminate the problems associated with prior art.

A specific object of the invention is to provide a container for cooking pasta in a microwave oven that permits t e use of a predetermined quantity of water, and in any case larger than the minimum quantity necessary for cooking spaghetti, but not larger than the quantity permitted inside a microwave oven for technical reasons such as evaporation and the time required for boiling the pasta.

Another object of this invention is to provide a container for cooking pasta in a microwave oven that performs automatic stirring while cooking the pasta, and spaghetti in particular.

A further object of the invention is to provide a container for cooking pasta in a microwave oven that can be used as a colander after cooking spaghetti, without requiring any arrangements for transferring it from one container into another.

A further object of the invention is also to provide a container for cooking pasta in a microwave oven that can control the foam produced during cooking of spaghetti, in order to prevent all problems involved with foam forming.

Last but not least of the objects of the invention is to provide a container for cooking pasta in a microwave oven that is very simple to manufacture and inexpensive, while at the same time performing all the functions of cooking, draining and cooking time control a predetermined quantity of spaghetti in a reduced amount of water with perfect results.

SUMMARY OF THE INVENTION

These objects are achieved with a container for cooking pasta in a microwave oven that has a body produced in a material compatible with microwave ovens, with an internal compartment to hold the pasta cooking water and a means for stirring said pasta during its cooking.

BRIEF DESCRIPTION OF THE DRAWING

Further characteristics and advantages of the invention will become apparent from a description of a preferred, but not exclusive embodiment of a container for cooking pasta in a microwave oven according to the invention, illustrated in the accompanying drawing in which.

SPECIFIC DESCRIPTION

Figure 1:
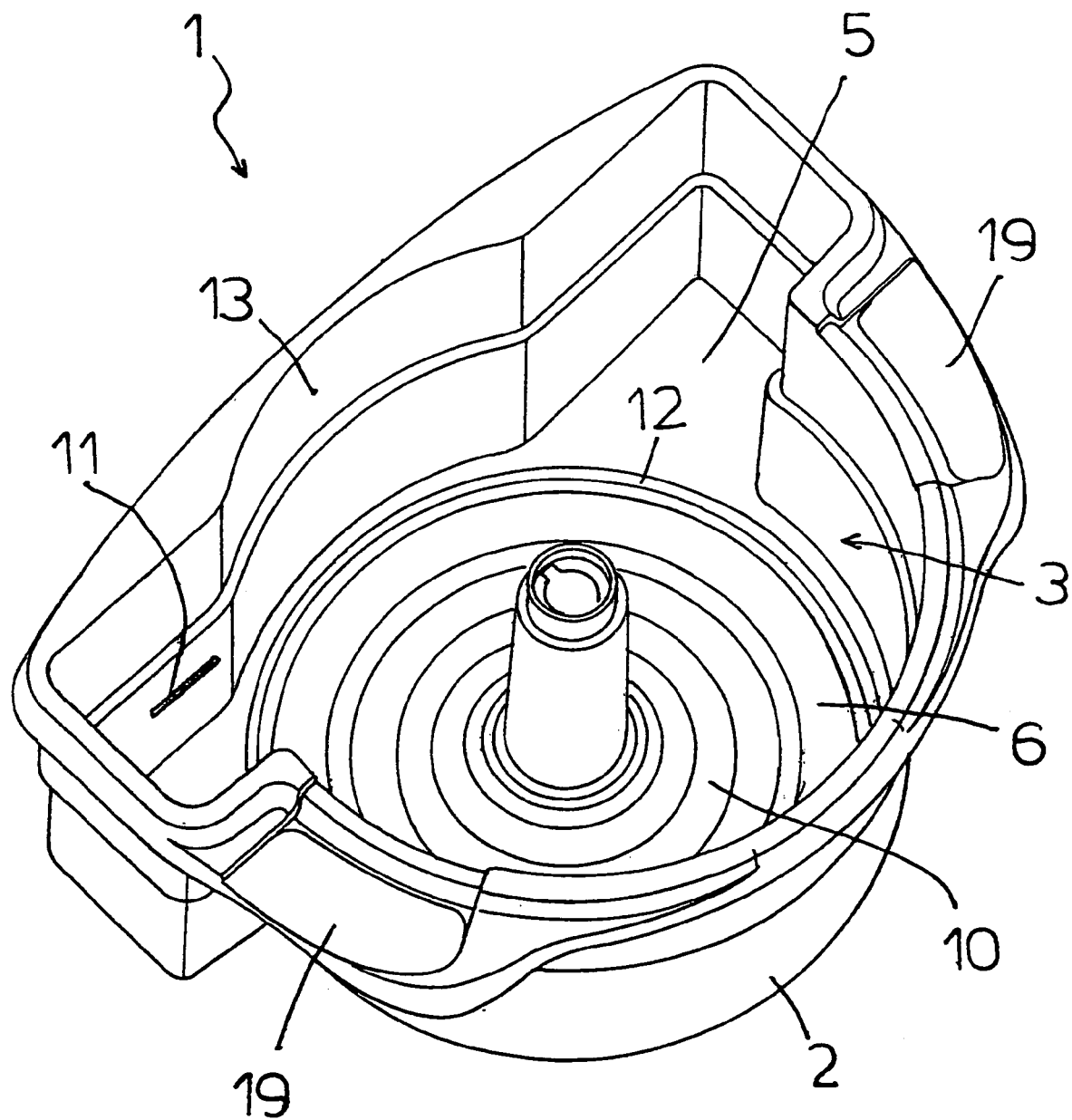
FIG. 1 is a perspective view of the container according to the invention.
Figure 2:
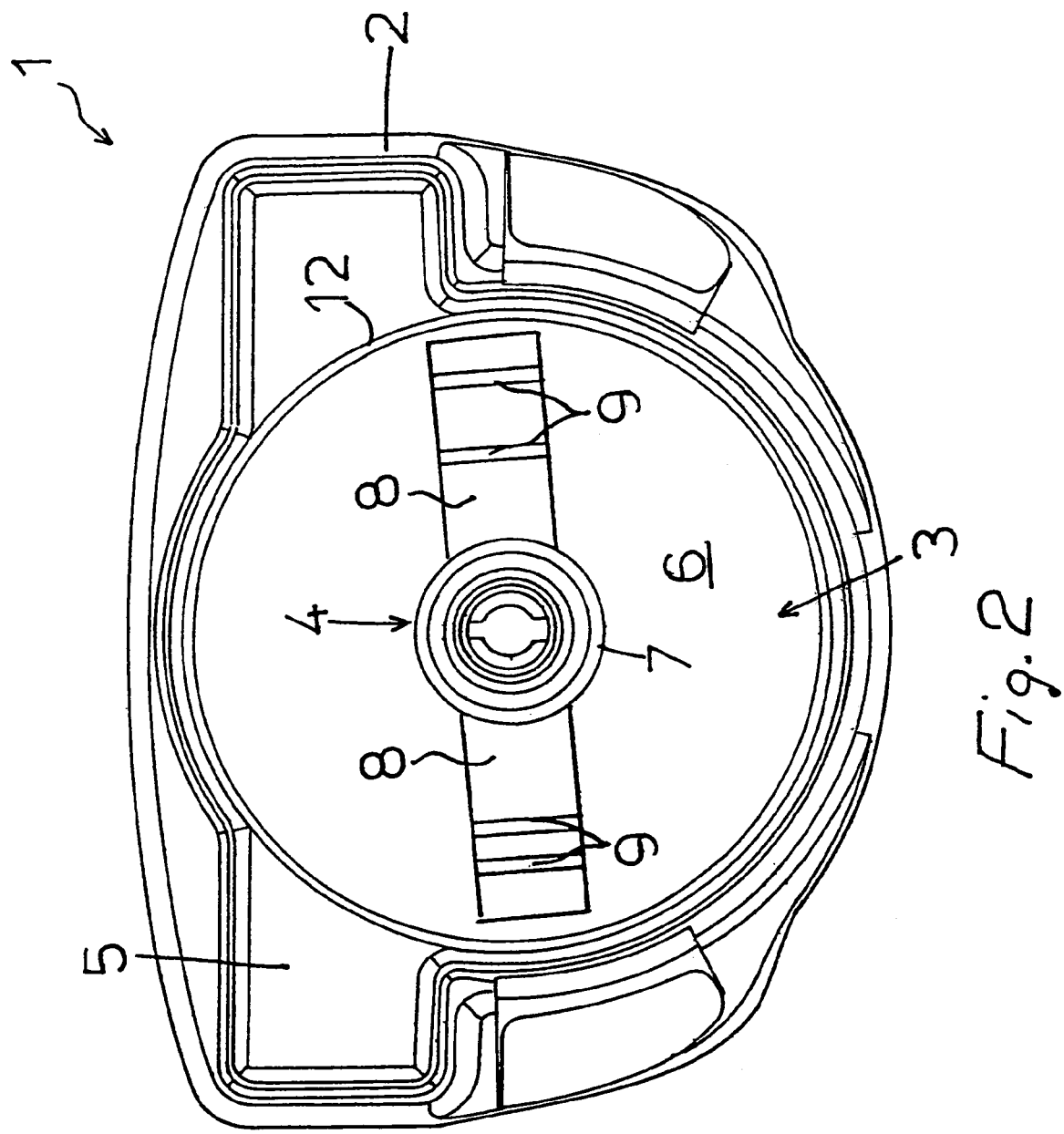
FIG. 2 is a plan view of the container illustrated in FIG. 1 according to the invention.

With reference to the figures described above, the container for cooking pasta in a microwave oven is identified throughout by the reference numeral 1, is composed of a body produced in a material compatible with a microwave oven, i.e. suitable for use inside a microwave oven, and for cooking a food product, for example long fine pasta inside the container, and in particular in the case provided as an example, spaghetti.

The container is composed of a body 2 having a compartment 3, containing a predetermined amount of water for cooking the pasta, as well as a means 4, for stirring the pasta during cooking.

More precisely, compartment 3 is composed of a first chamber 5, that holds the pasta, and in particular, spaghetti, and of a second chamber 6 in which the spaghetti is cooked.

The first chamber 5 has a basically square shape so that it is has practically the same shape as a conventional spaghetti box packaging to permit the gathering and storing of the spaghetti in a suitable manner so that once it is soft enough, it can be picked up for the cooking stage. The second chamber is different from the first chamber in that it is generally circular in shape and very similar to a traditional-saucepan used for cooking and stirring spaghetti.

The stirring means is composed of a device for picking up the spaghetti and transferring it from the first chamber 5 to the second chamber 6, and in particular, it comprises a blade 7 that is rotatingly connected to the second chamber 6.

The blade 7 comprises at least 'one arm 8, and in particular, in the case shown as an example, two arms 8, each of which bears the spaghetti moving devices in the form of one or more serrations 9, that protrude vertically from each arm 8, set parallel to the bottom 10 of the second chamber 6.

The first and second chambers 5 and 6 are conveniently marked with a notch 11, provided on the surfaces thereof, adapted to show the optimum water level for the amount of spaghetti required to substantially fill the first chamber 5.

This way, the user can measure out the exact amount of water and spaghetti for optimizing cooking with water and energy savings.

The bottom 10 in the second chamber 6 also comprises a ridge 12 (FIG. 1) adapted to protect the tips of the arms during the rotation action to prevent the spaghetti from being crushed or broken by arm rotation during stirring thereof.

Figure 3:
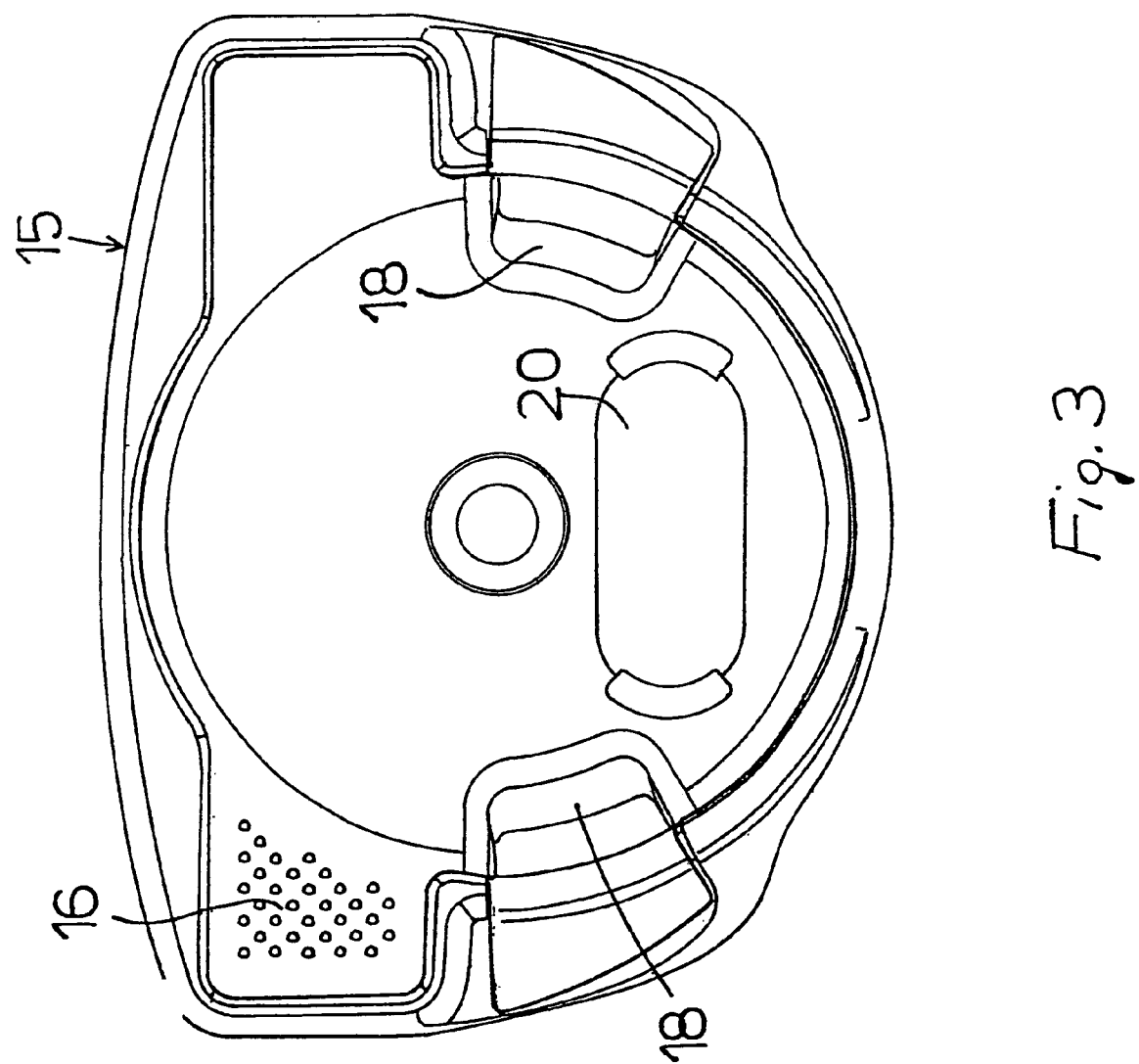
FIG. 3 shows a plan view cf the closing lid of the container according to the invention.

The first chamber 5 also comprises a recess 13, for easier spaghetti introduction in the chamber. A lid 15 is placed on top of the container to close the first and second chambers 5 and 6 (FIG. 3).

The lid 15 has at least one covering portion that covers one end or both ends of the first chamber 5, having a plurality of holes 16 to allow draining off the water from compartment 3 after the pasta is cooked.

The lid also comprises two handles 18, opposite each other and with an "L" shape that perform two functions at the same time: they maintain the lid in position on the container during water draining, and are used to raise or remove the lid for access to the pasta once it has been cooked and drained.

For this reason, the body 2 of the container has two fins 19 (FIG. 1) underneath the two handles 18, to enable the user to insert the fingers under the handles while holding the handles with the thumbs so that the lid is maintained in position in contact on top of the container during draining operations.

Advantageously, the lid 15 also comprises a foam prevention opening 20 that is free to oscillate between open and closed position and vice versa on the lid when the internal pressure in compartment 3 exceeds the established value.

In this way, during the cooking of spaghetti or any other type of pasta, when the usual cooking foam forms inside, the internal pressure tends to open the opening 20, that when open, permits air to enter compartment 3, reducing the foam formation.

As described above, this opening 20 can be used to reduce the cooking foam and to control the cooking progress or remove a sample to taste in order to achieve the desired degree of cooking, which can be greater or less than the required level recommended for that particular type of pasta.

It has been demonstrated practically that the container of the finding is particularly advantageous in that spaghetti, for example, can be cooked without having to break it in half.

Moreover, the provision of the opening permits quicker water temperature rise, without foam forming or over boiling during cooking because, as described above, the opening increases the heat exchange between the boiling water and the surrounding environment, making evaporation easier.

Moreover, the invention provides access to the food in the container for tasting without having to empty the water, permitting continuation of the cooking process with minimum time loss and maintaining the quality of the final cooking results.

The design of the container can be subject to numerous modifications and variants all of which remain within, the basic inventive concept; moreover all components can be replaced with technically equivalent elements.

Basically, all materials employed, and the size of the container can be of any type according to need and the state of the art.

The invention claimed is:

1. A container for cooking pasta in a microwave oven, comprising a body manufactured in a material compatible with microwave ovens and formed with an internal compartment to contain pasta and cooking water and a stirring means for stirring said pasta during cooking, said compartment having at least one first chamber to hold said pasta and a second chamber to cook said pasta, said stirring means comprising a transfer device for moving said pasta from said first chamber to said second chamber.

2. The container defined in claim 1 wherein said first chamber has a generally square shape and that said second chamber has a generally semi-circular shape.

3. The container defined in claim 2 wherein said stirring means comprises a blade rotatingly connected to said second chamber.

4. The container defined in claim 3 wherein said blade comprises at least one arm forming said transfer device.

5. The container defined in claim 4 wherein said transfer device comprises at least one serration protruding vertically from said arm positioned parallel to the bottom of said second chamber.

6. The container defined in claim 1 wherein said pasta is a long and fine type of pasta and is positioned in said first chamber.

7. The container defined in claim 1, further comprising a lid to close said first and second chambers.

8. The container defined in claim 7 wherein said lid includes at least one portion provided with a plurality of holes for pouring out said water from said compartment during draining of said pasta.

9. The container defined in claim 7 wherein said lid includes two handles shaped and positioned to perform the function of retaining said lid on said body during draining of said pasta and for removal of said lid from said body to extract said pasta.

10. The container defined in claim 7 wherein said lid has at least one opening to prevent foam formation that can be brought from an open to a closed position and vice versa on said lid when the internal pressure of said compartment exceeds an established value.

\* \* \* \* \*